US006181518B1

United States Patent
Harris et al.

(10) Patent No.: US 6,181,518 B1
(45) Date of Patent: Jan. 30, 2001

(54) TRANSVERSE PRESSURIZATION CONTOUR SLIDER

(75) Inventors: John F. Harris, Boulder; Georgene M. Nielsen, Westminster; Dan William Quintana, Louisville, all of CO (US)

(73) Assignee: Quantum Corporation, Milpitas, CA (US)

(*) Notice: Under 35 U.S.C. 154(b), the term of this patent shall be extended for 0 days.

(21) Appl. No.: 08/906,224

(22) Filed: Aug. 4, 1997

Related U.S. Application Data

(63) Continuation of application No. 08/008,337, filed on Jan. 25, 1993, now abandoned.

(51) Int. Cl.[7] ................................................ G11B 5/60

(52) U.S. Cl. ..................................... 360/236.6; 360/236.7
(58) Field of Search ................................. 360/103, 236.6, 360/236.7

(56) References Cited

U.S. PATENT DOCUMENTS

| 4,673,996 | 6/1987 | White | 360/103 |
|---|---|---|---|
| 4,870,519 | 9/1989 | White | 36/103 |
| 5,062,017 | * 10/1991 | Strom et al. | 360/103 |
| 5,156,704 | * 10/1992 | Kemp | 360/103 |

FOREIGN PATENT DOCUMENTS

| 63-103406 | * 5/1988 | (JP) | 360/103 |

OTHER PUBLICATIONS

The Transverse Pressure Contour Slider: Flying Characteristics and Comparisons with Taper–Flat and Cross–Cut Type Sliders. James R.White Adv. Info. Storage Technology vol. 3. 1991.

A Uniform Flying Height Rotary Actuated Air Bearing Slider. James R. White IEEE Transactions on Magnetics, vol. Mag. 22, No. 5, Sep. 1986.

* cited by examiner

Primary Examiner—David Davis
(74) Attorney, Agent, or Firm—Holland & Hart; Hogan & Hartson

(57) ABSTRACT

An improved transverse pressurization contour (TPC) slider and method for manufacturing the same in which the TPC surfaces occupy more than 50% of the slider rail surfaces. The rail widths may be defined by a shallow etching step in conjunction with a deeper central saw cut defining an ambient pressure slot. Alternatively, the rail widths may be defined by multiple saw cuts. The air bearing surfaces (ABS) may be defined in a single photolithographic step. Utilizing TPC surfaces of greater than 50% of the rail surfaces allows the use of saw cuts to define the rail dimensions and ambient pressure slot with decreased sensitivity to lateral mispositioning of the cuts. The improved TPC slider and method for manufacturing the same provides a simplified, reproducible device and process which is much more rapidly effectuated than processes relying on conventional chemical etching, reactive ion etching or ion milling operations. Also in accordance with a process of the present invention, leading edge ramps of the rails may be advantageously formed prior to definition of the air bearing surfaces and transverse pressurization contours.

4 Claims, 9 Drawing Sheets

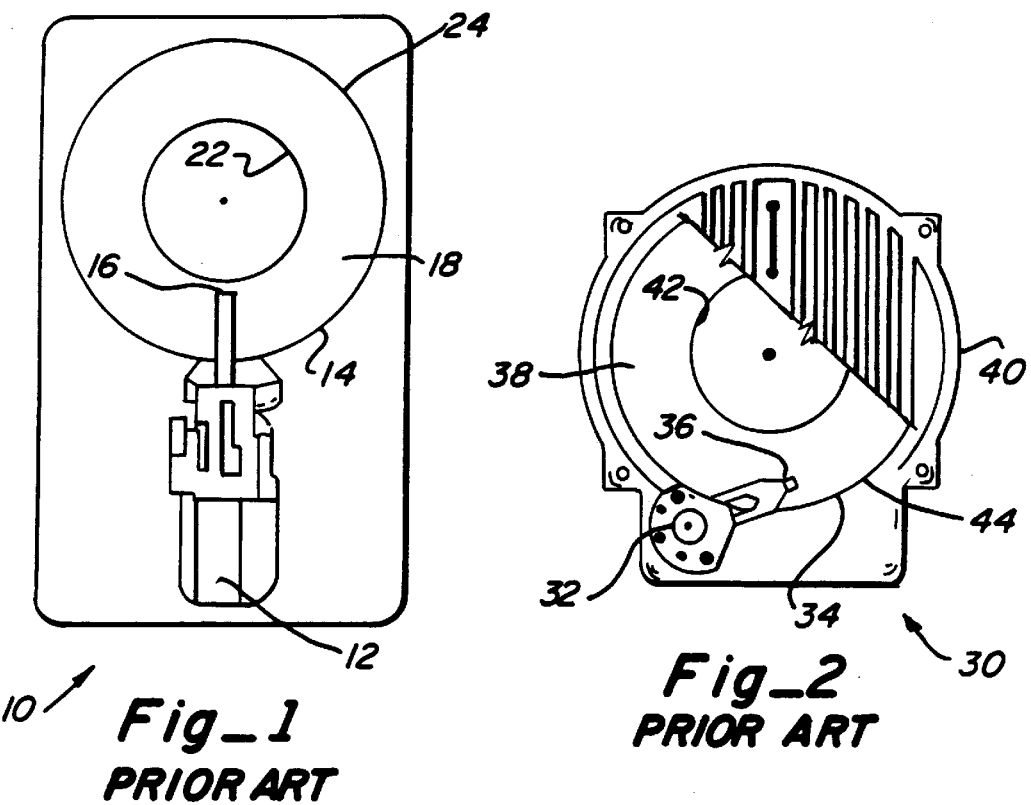
Fig_1 PRIOR ART
Fig_2 PRIOR ART
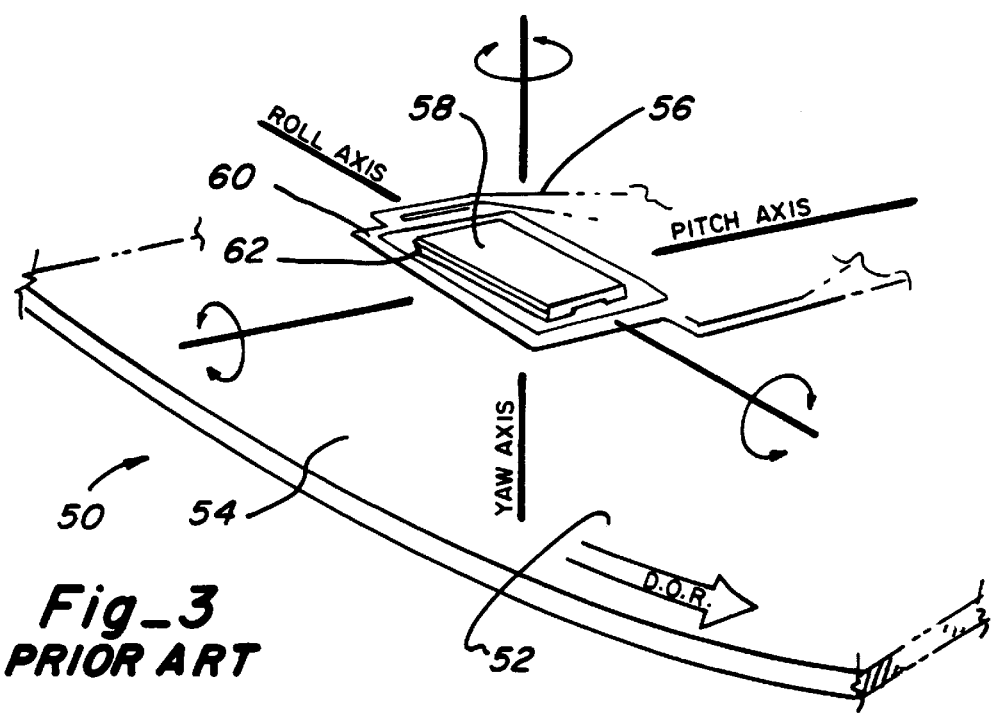
Fig_3 PRIOR ART

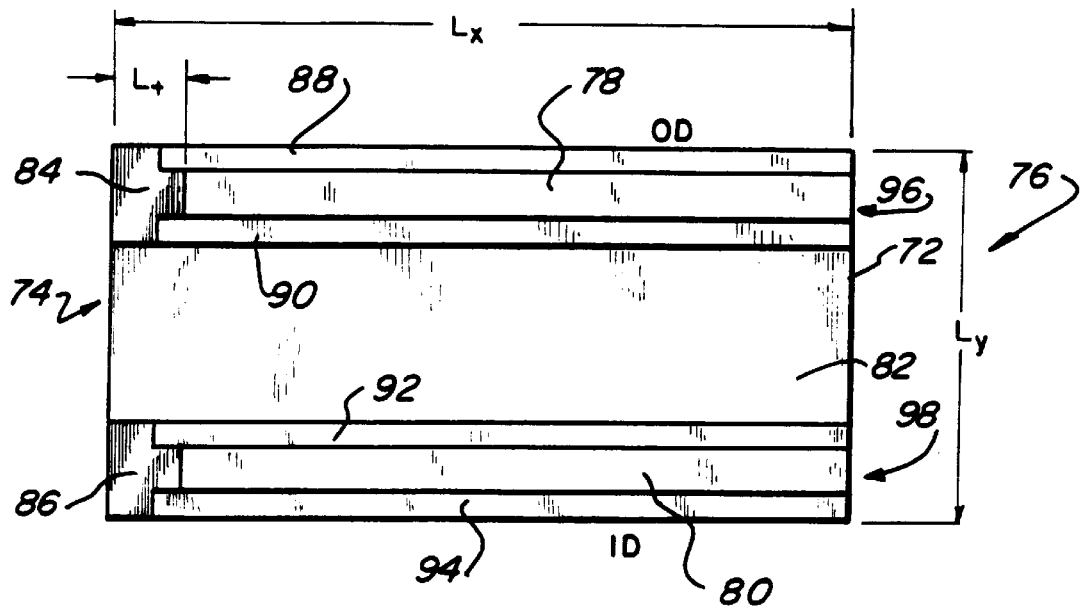
Fig_4a
PRIOR ART
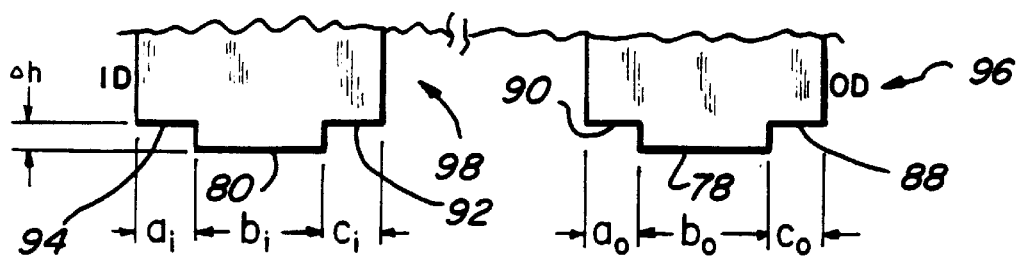
Fig_4b
PRIOR ART

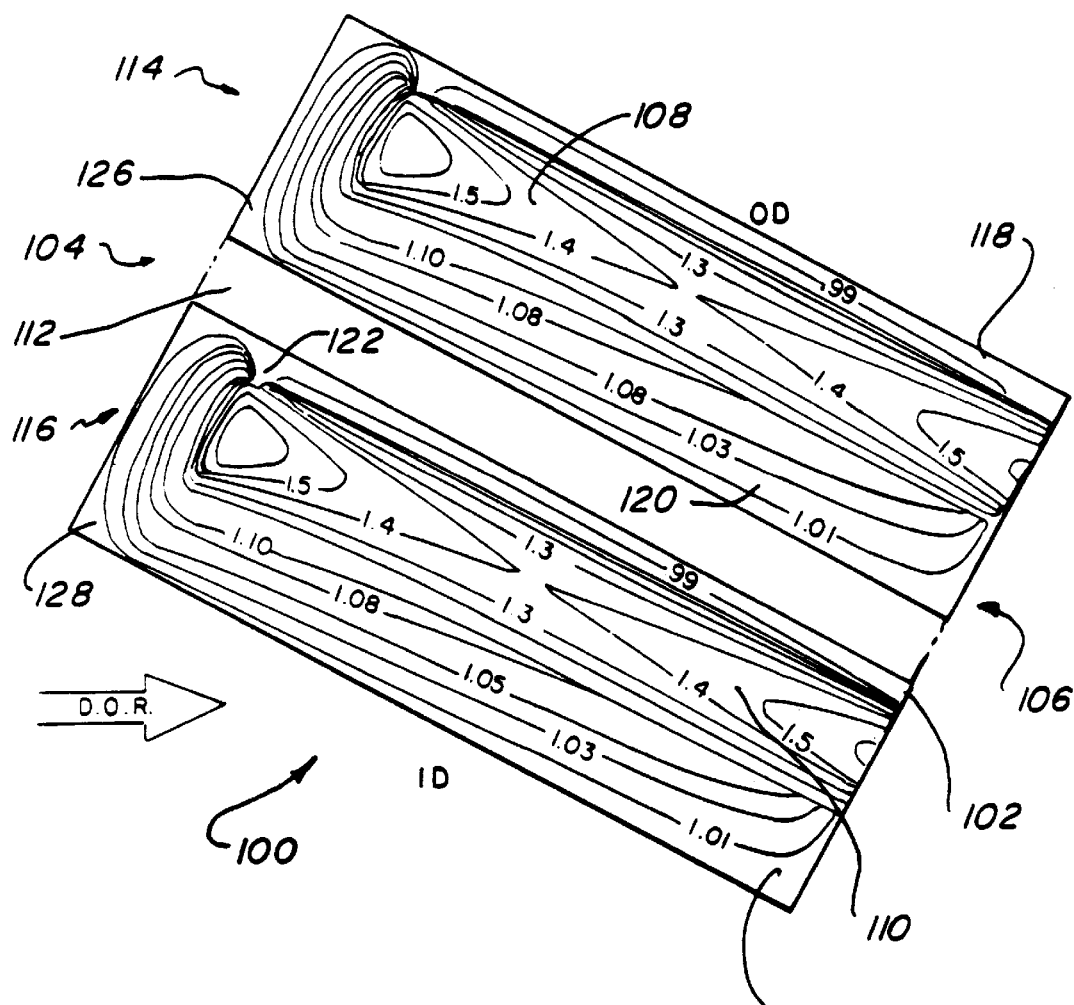
Fig_5a
PRIOR ART

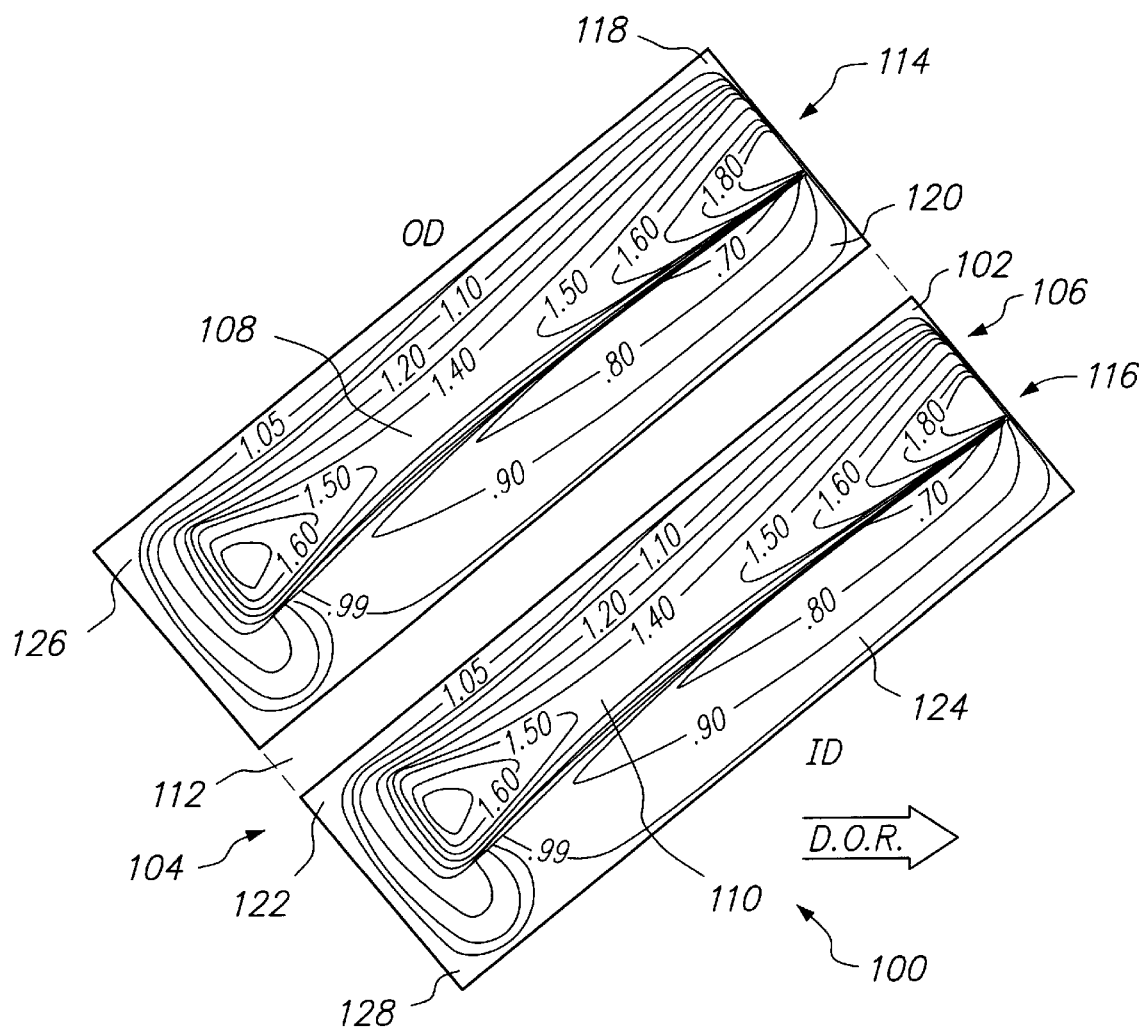
Fig_5b
PRIOR ART

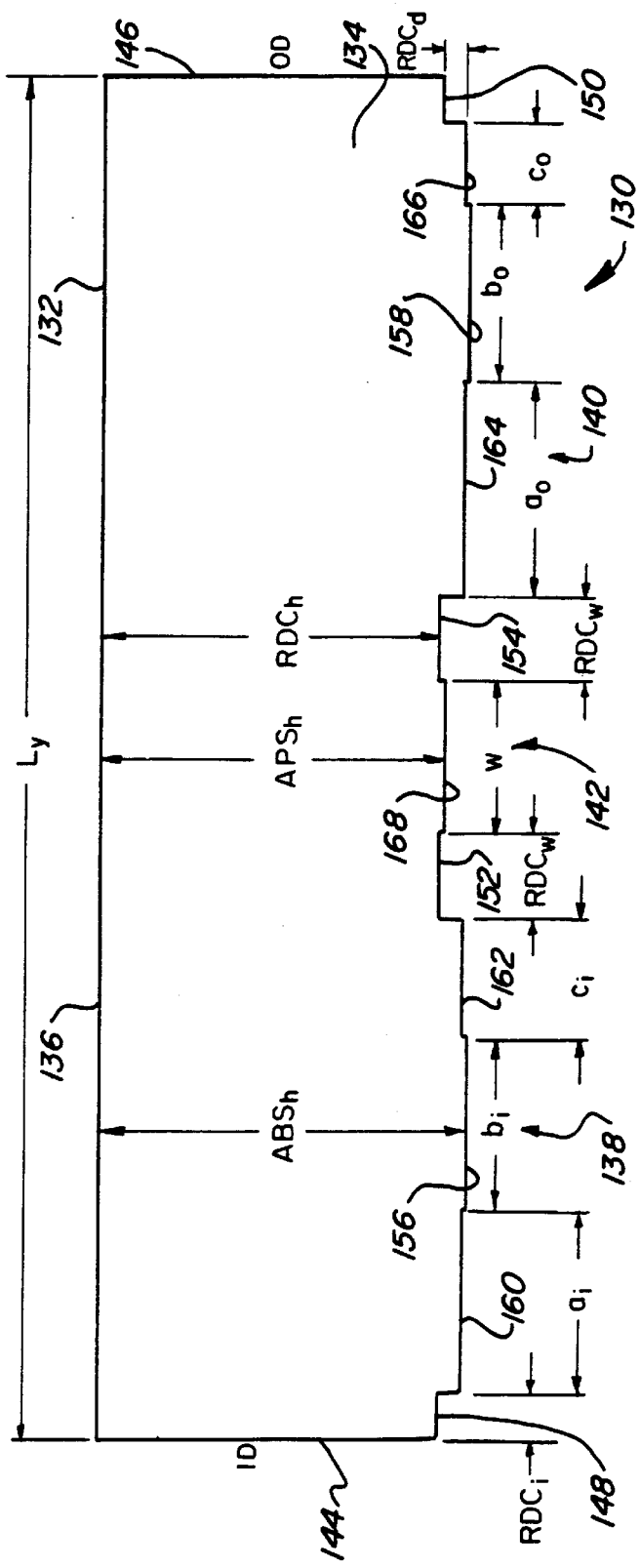

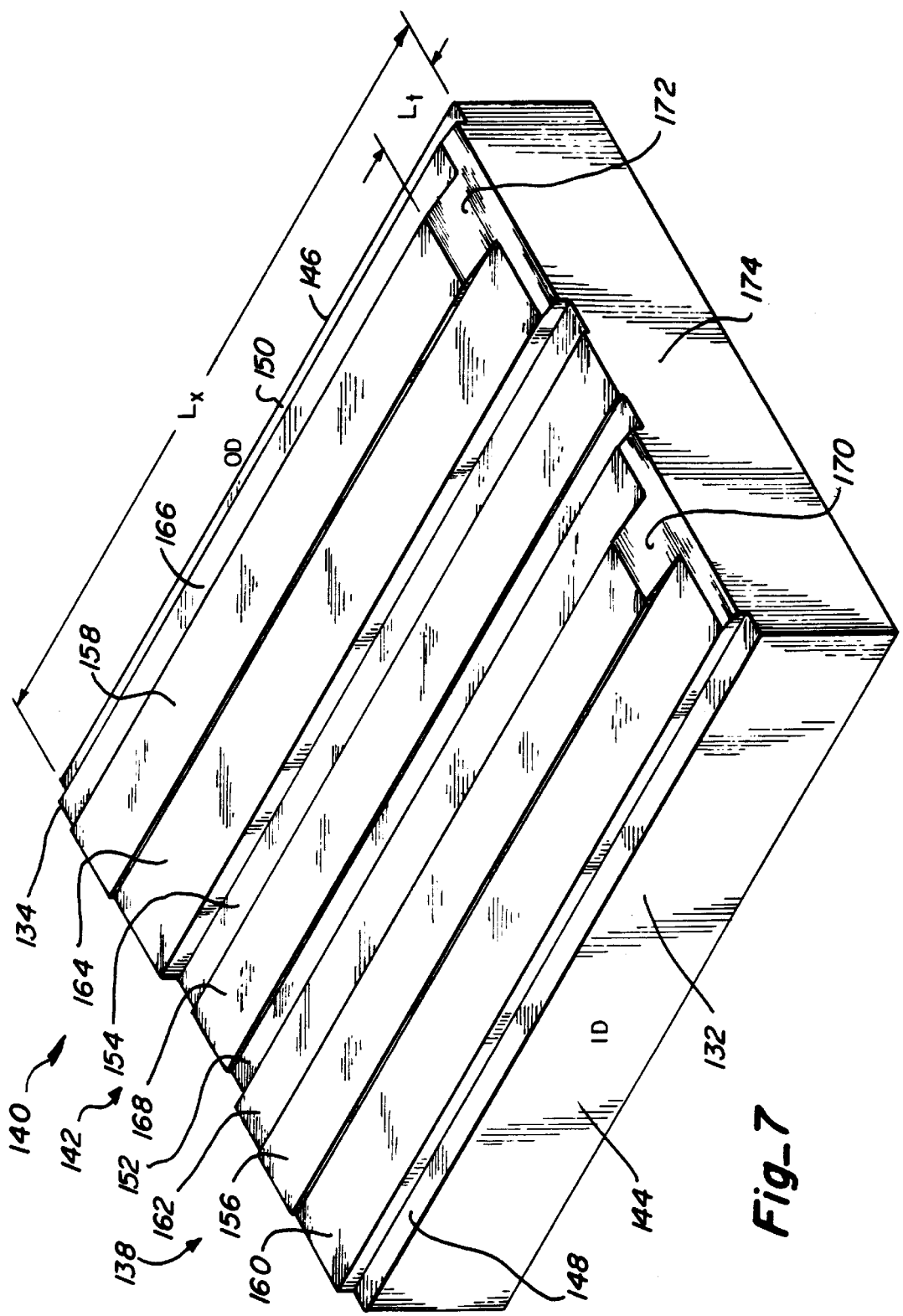

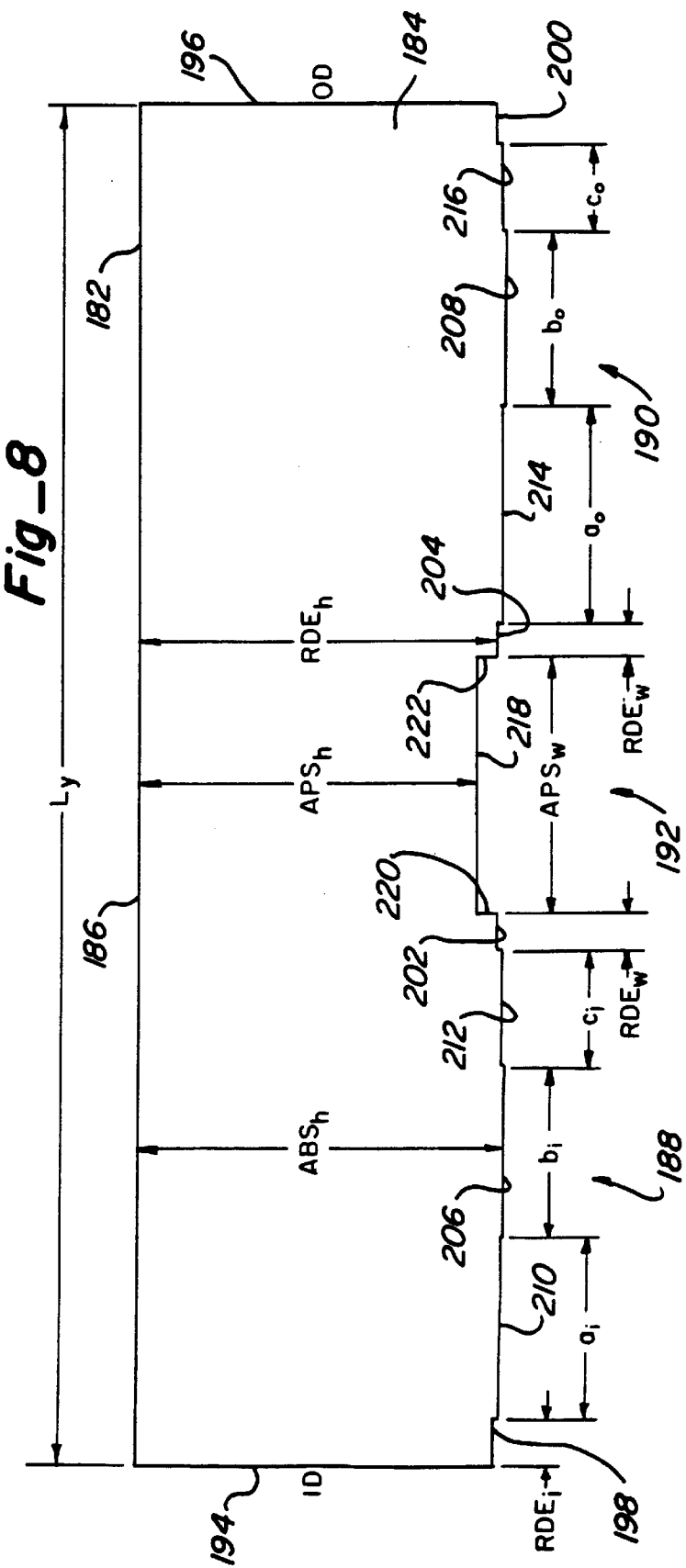
Fig_8

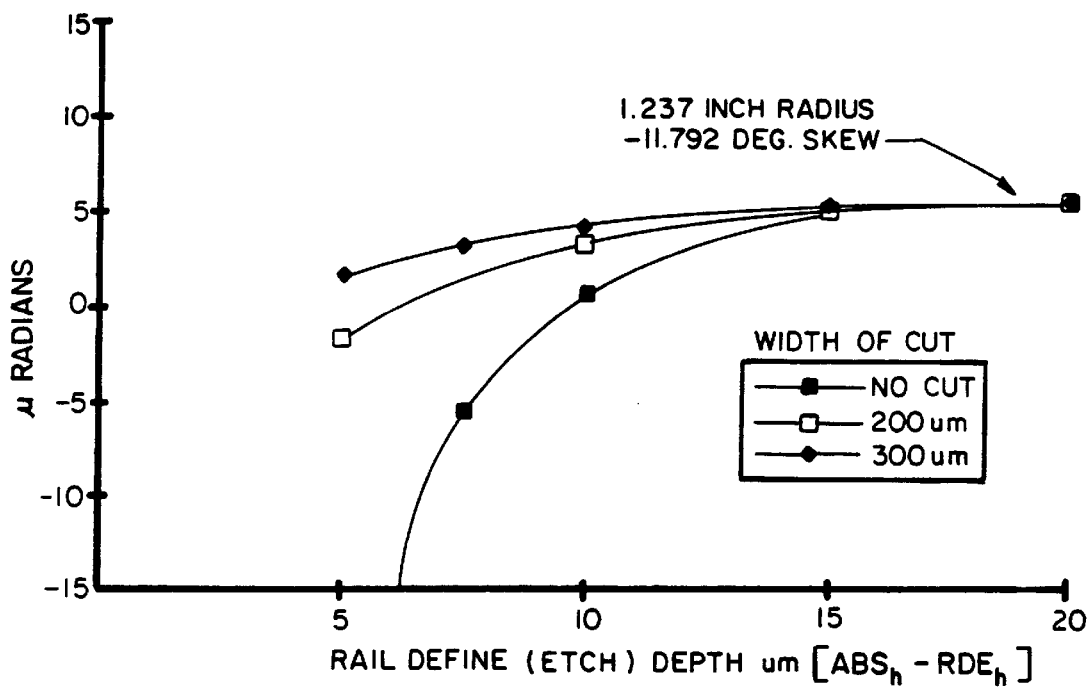
Fig_9
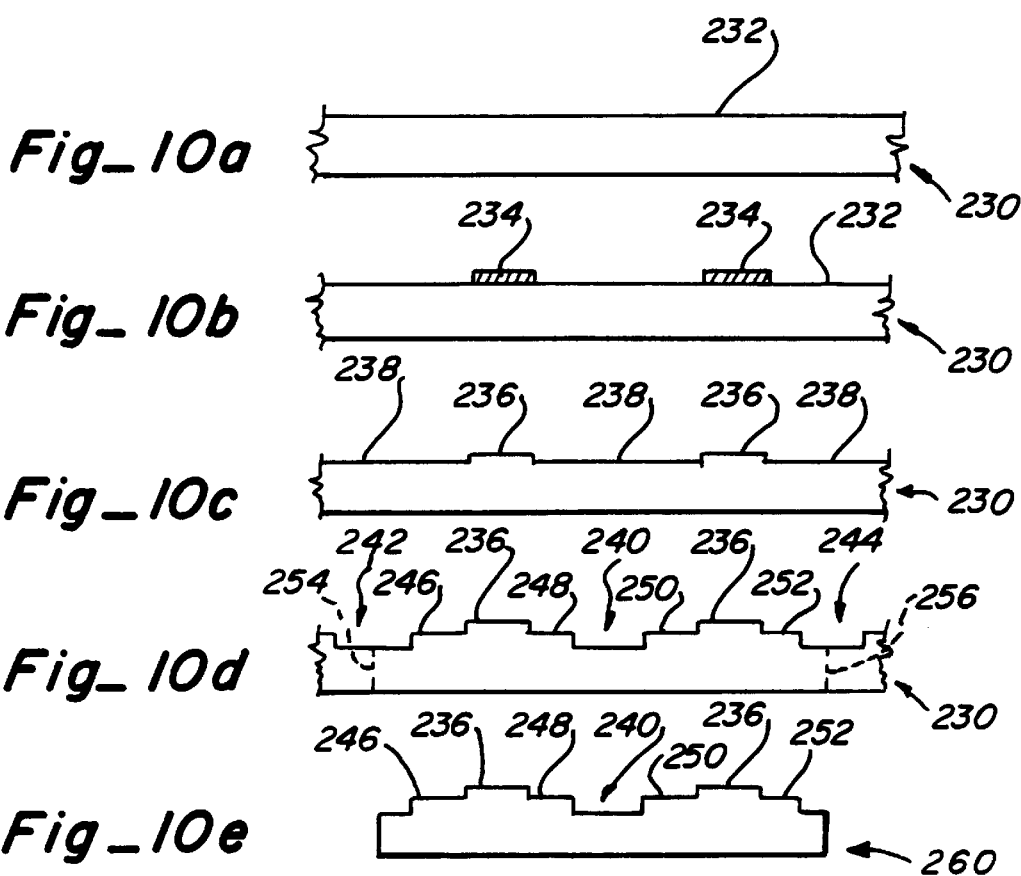

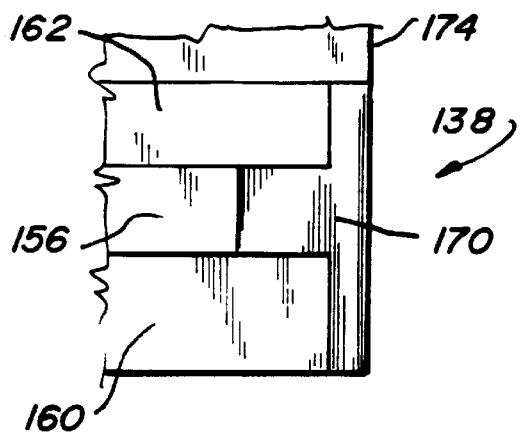
Fig_11a
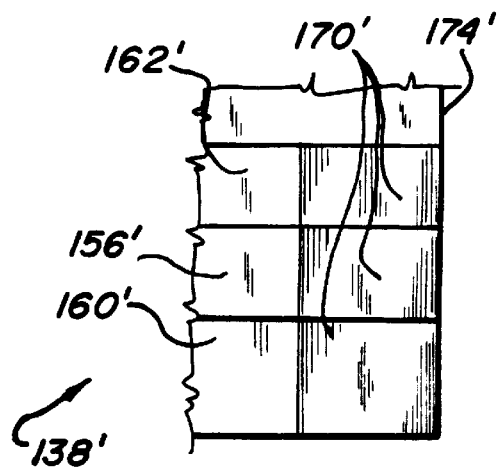
Fig_12a
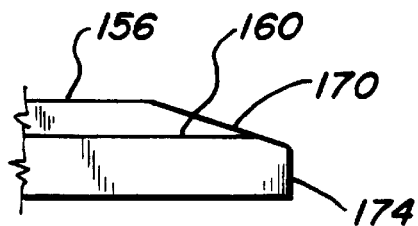
Fig_11b
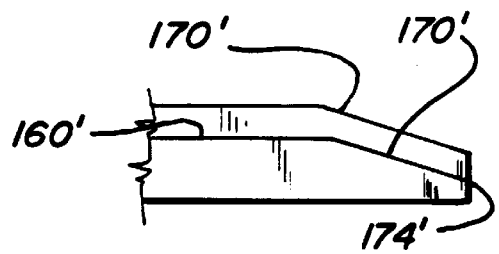
Fig_12b
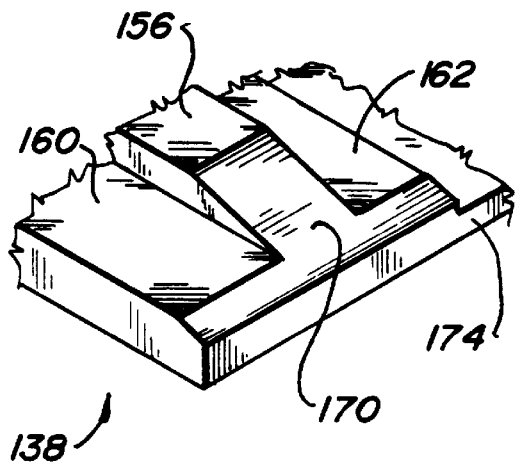
Fig_11c
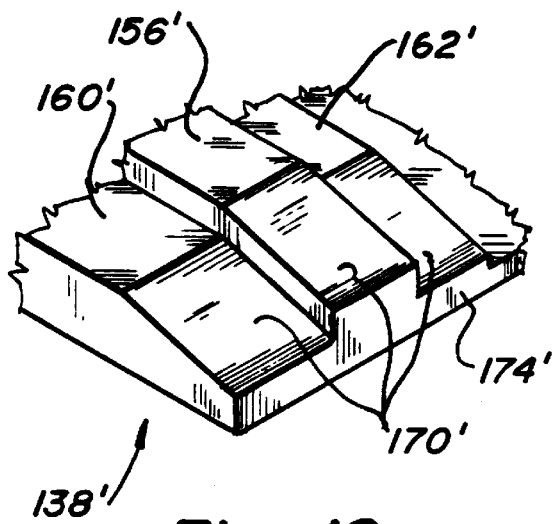
Fig_12c

6,181,518 B1

TRANSVERSE PRESSURIZATION CONTOUR SLIDER

This application is a continuation of Ser. No. 08/008,337 filed Jan. 25, 1993 now abandoned.

BACKGROUND OF THE INVENTION

The present invention relates, in general, to transverse pressurization contour (TPC) sliders and methods for making the same. More particularly, the present invention relates to a TPC slider structure for use in conjunction with a computer storage device transducer in rotary actuated disk drives which exhibits controllably uniform flying height in relationship to a rotating storage medium and provides simplified manufacturability with enhanced reproduceability.

In a computer mass storage device incorporating a rotating storage medium, such as a rigid, fixed or "hard" disk drive, a transducer is caused to be positioned adjacent the surface of the storage medium to read and/or write data therefrom or thereto. The transducer or "head" can be inductive (comprising a coil wrapped around a ferrite or permalloy core) or thin film (constructed through photolithographic techniques) incorporating either inductive or magnetoresistive principles of operation. In addition to reducing track widths on the rotating storage medium, thin film heads help increase bit density due to the fact that their magnetic gaps have more consistent size and shape than can be achieved with inductive technologies. Moreover, due to their more tightly coupled nature, thin film heads deliver greater output (larger amplitude pulses) as the head passes over the medium. The higher bit density achievable of necessity implies very small head gaps and concomitantly low "flying" heights. Flying heights on the order of about four micro inches or less are achievable with present day technologies.

In order to cause the head to fly on an air bearing adjacent the surface of the medium, it is generally mounted to (or in the case of older composite heads formed with) a slider. The slider facilitates the formation of a generally uniform air bearing between the transducer or head and the rotating disk surface.

With prior art linear actuator disk drives, the slider maintains a somewhat linear flying height above the surface or the storage media due to the fact that it maintains a constant skew angle with respect to the rotating disk surface by its constant radial position with respect to the direction of rotation. Fluctuations in flying height then are due primarily to the higher relative disk speed at its outer diameter (OD) than at its inner diameter (ID) and the tendency to fly lower at the ID that this induces.

More modern rotary actuated disk drives place additional demands on slider configuration inasmuch as a relatively constant flying height must be maintained while the slider undergoes sharp lateral accelerations due to seeking (thus changing its skew angle to the direction of rotation) as well as encountering the differing relative velocities of the disk surface at its outer and inner diameters. Flying heads close to a rotating disk surface with extreme lateral accelerations due to seek operations requires not only very flat media surfaces, but also a very stiff air bearing for slider stability. Moreover, it can be seen that as with the linear actuator disk drives, the velocity of the slider over the outer diameter of a disk drive will be greater than at its inner diameter since the angular velocity of the rotating disk medium again, remains constant. In this regard, the slider will also tend to fly higher at the disk outer diameter and, conversely, lower at the disk inner diameter.

In an attempt to solve the problems attendant the requirements of maintaining generally uniform flying height of a read/write head in a rotary actuated disk drive despite lateral accelerations due to seek operations and relative radial positions with respect to the outer and inner diameters of the disk drive, a transverse pressurization contour (TPC) slider has been proposed. Such TPC sliders have been described in: White, J. W.,: "A Uniform Flying Height Rotary Actuated Air Bearing Slider", IEEE Transactions on Magnetics, Vol. MAG-22, No. 5, September 1986, pp. 1028–1030; U.S. Pat. No. 4,673,996 issuing to White for "Magnetic Head Air Bearing Assembly Utilizing Transverse Pressurization Contours"; and U.S. Pat. No. 4,870,519 issuing to White for "Uniform Flying Height Slider Assembly with Improved Dynamic Air Bearing Characteristics".

Many of the difficulties encountered in trying to obtain a uniform flying height profile over a wide range of skew angles and rotating disk radii have been addressed through the use of the TPC slider described in the prior art. However, the accompanying problem of accommodating large manufacturing tolerances in the manufacturing of TPC slider has not been fully addressed. That is, if one were to attempt to define the TPC rail widths of such a slider with conventional sawing techniques, lateral mispositioning of the saw can cause a wide variation in the effective angle (as defined in the aforementioned patents) of each TPC slider. As new sliders are designed to fly lower and lower (that is, closer to the rotating disk surface), the main air bearing surface ("ABS") portion of the rails gets narrower and the effect of a mispositioned cut on the effective TPC angle becomes greatly magnified, especially if TPC widths are scaled down the same as the other slider dimensions. Prior art TPC references have heretofore specified a total TPC width occupying from approximately 10% to 50% of the rail surface.

In addition, defining TPC width dimensions through the use of photolithographic techniques along with chemical etching, reactive ion etching or ion milling, while offering more precision than saw cutting, are nonetheless very time consuming, with the time required to perform the etch or milling operation being proportional to the desired depth. With conventional TPC sliders, the extra time, photomasking step and photoresist thicknesses required to form an ambient pressure slot between the ABS/TPC rails limits the desirability of such methods for manufacturing a TPC slider.

SUMMARY OF THE INVENTION

To address the deficiencies of the previously described TPC sliders, a slider and method for the manufacture thereof is provided in which the TPC steps (or contours) occupy more than 50% of each rail, and in which the width of each TPC surface may be defined by another relatively shallow etch with an additional saw cut to form an ambient pressure slot between the slider rails. The depth of the secondary rail defining etches need not be deep enough to relieve the pressure to ambient between the air bearing surfaces, which is especially important at high skew angles. However, the effect on flying height is minimized by the addition of the relatively deep ambient pressure slot between the rails which may be provided by a saw cut which is relatively insensitive to lateral mispositioning. Lateral mispositioning of the saw cut is of little consequence provided that it does not totally eliminate the shallow rail defining shoulders. Further provided herein is a process for manufacturing a TPC slider in which the air bearing surface can be defined in a single photolithographic etching step while the TPC surfaces can be defined by means of multiple saw cuts alone.

What is provided therefore, is a slider for controlling the flying height of a computer storage device transducer above a rotating storage medium which is formed of a generally elongated body portion presenting at least one substantially planar major surface having leading and trailing edges thereof. A pair of generally parallel and spaced apart rails are disposed on the major surface substantially between the leading and trailing edges. The rails have distal storage medium facing surfaces which include the air bearing surfaces. Transverse pressurization contours are longitudinally disposed on the rails medially and laterally of the air bearing surfaces. The transverse pressurization contours occupy more than 50% of the medium facing surfaces of the rails.

Further provided is a slider for maintaining a computer storage device transducer at a generally uniform flying height above a rotating storage medium as the slider is positioned with respect thereto. The slider includes a generally elongate body portion having at least one major surface presenting at least two longitudinally positioned, generally parallel and spaced apart rails for extension towards the rotating storage media. The improvement includes an air bearing surface formed on a distal surface portion of the rails wherein the air bearing surface occupies less than 50% of the distal surface portion of the rails. At least one transverse pressurization contour adjoins the air bearing surface at the distal surface portion of the rails.

Further provided is a method for manufacturing a slider having rail portions including air bearing surfaces and at least one medially and laterally disposed transverse pressurization contour at distal surface portions of the rails, the rails being separated by an ambient pressure slot, wherein the process includes the step of providing a substrate presenting a first substantially planar surface thereof. At least two generally parallel and spaced apart surface features are defined on the substrate at the first substantially planar surface thereof. The defined surface features establish the air bearing surfaces. Portions of the first substantially planar surface of the substrate surrounding the air bearing surfaces are removed to establish a second substantially planar surface generally uniformly displaced from the air bearing surfaces. The second substantially planar surface establishes a surface of the transverse pressurization contours. A first channel is cut away in the second substantially planar surface of the substrate medially displaced between the air bearing surfaces in a generally parallel relationship thereto. The first channel establishes the ambient pressure slot and surface area dimensions of the medially disposed transverse pressurization contours with respect to the air bearing surfaces. Second and third channels are additionally cut away in the second substantially planar surface of the substrate laterally displaced from the air bearing surfaces and in a generally parallel relationship thereto. The second and third channels define the surface area dimensions of the laterally disposed transverse pressurization contours with respect to the air bearing surfaces.

Further provided is a method for manufacturing a slider having rails thereof including air bearing surfaces, wherein the slider also includes at least one medially and laterally disposed transverse pressurization contour, with the rails being separated by an ambient pressure slot. The slider is manufactured by a process of providing a substrate presenting a first substantially planar surface and forming a leading edge ramp at an end portion of the substrate, the leading edge ramp presenting a first beveled surface thereof. At least two generally parallel and spaced apart surface features are defined on the first beveled surface of the leading edge ramp and the first substantially planar surface of the substrate, wherein the defined surface features on the first substantially planar surface establish the air bearing surfaces of the slider. Portions of the first beveled surface of the leading edge ramp and the first substantially planar surface of the substrate surrounding the defined surface features are removed to establish a second beveled surface of the leading edge ramp and a second substantially planar surface of the substrate generally uniformly displaced from the first beveled surface and the first substantially planar surface respectively, wherein the second substantially planar surface establishes a surface of the transverse pressurization contours. Portions of the second substantially planar surface of the substrate are eliminated to a predetermined depth and at a predetermined position from the air bearing surfaces to define surface dimensions of the transverse pressurization contours.

BRIEF DESCRIPTION OF THE DRAWINGS

The foregoing, and other features and objects of the present invention and the manner of attaining them will become more apparent, and the invention itself will be best understood by reference to the following description of a preferred embodiment of the present invention taken in conjunction with the accompanying drawings, wherein:

FIG. 1 is a simplified plan view of a prior art computer mass storage device, such as a disk drive, utilizing a linear actuator for positioning a transducer, or head, with respect to the surface of a rotating storage medium;

FIG. 2 is a simplified, partially cut away plan view of a prior art disk drive utilizing a rotary actuator and illustrative of the varying skew angles with which a transducer interfaces with the rotating magnetic media as it seeks between the disk outer diameter and inner diameter;

FIG. 3 is an enlarged, simplified partial isometric view of a prior art slider illustrating its relationship to a rotating storage medium surface and its roll, pitch and yaw axes;

FIGS. 4a and 4b are bottom plan and end views, respectively, of a prior art transverse pressurization contour (TPC) slider showing the air bearing surfaces and medially and laterally disposed transverse pressurization contours in conjunction with rail leading edge ramps;

FIGS. 5a and 5b are illustrative views of the functionality of the transverse pressurization contours of a prior art slider showing how the TPC surfaces function to provide lift to the slider which varies in accordance with the slider skew with respect to the direction of rotation of the rotating storage media;

FIG. 6a is a rear end view of a TPC slider in accordance with the present invention illustrating TPC surfaces occupying greater than 50% of the slider rail width;

FIG. 6b is a partial enlarged view of a portion of the TPC slider of the present invention illustrating the TPC step at one point thereof with respect to the rail air bearing surface;

FIG. 7 represents an additional isometric view of the TPC slider of the present invention as illustrated in FIG. 6a, further illustrating the relationship between the rail air bearing surfaces and medially and laterally disposed TPC surfaces occupying greater than 50% of the rail surface;

FIG. 8 is an additional rear end view of an alternative embodiment of a TPC slider in accordance with the present invention illustrating the utilization of a central saw cut to establish an ambient pressure slot in conjunction with rail define etches establishing the respective dimensions of the medially and laterally disposed air bearing surfaces;

FIG. 9 is a graphic representation of the benefits of utilizing a central saw cut to define the ambient pressure slot relating the slider roll to the depth of a rail define etch in conjunction with central saw cuts of varying depths;

FIGS. 10a–10e are illustrative of a process for of manufacturing a TPC slider in accordance with the present invention utilizing photolithography to define the slider air bearing surfaces and multiple saw cuts to define the ambient pressure slot as well as the relative dimensions of the medially and laterally disposed TPC surfaces of the slider rails;

FIGS. 11a–11c illustrate bottom plan, side and isometric views respectively of a portion of the TPC slider of the present invention illustrated in FIGS. 6a–6b and 7 showing the formation of a TPC slider rail leading edge ramp by, for example, lapping of the slider leading edge subsequent to the formation of the TPC surfaces; and FIGS. 12a–12c illustrate bottom plan, side and isometric views respectively of a portion of a TPC slider of the present invention analogous to the structure illustrated in FIGS. 11a–11c in which a TPC slider rail leading edge ramp may be advantageously formed by, for example, lapping of the slider leading edge prior to the formation of the TPC surfaces.

DESCRIPTION OF PREFERRED EMBODIMENTS

With reference to FIG. 1, a prior art linear actuator disk drive 10 is shown. Prior art linear actuator disk drive 10 incorporates a linear positioner 12 for positioning a computer read/write transducer or read/write head 16 with respect to data to be read from, or written to, a rotating magnetic disk 14. Read/write head 16 is moved radially across disk surface 18 of magnetic disk 14 from inner diameter (ID) to the outer diameter (OD) of magnetic disk 14. Enclosure 20 is provided to provide a relatively contaminant free environment for the operation of prior art linear actuator disk drive 10.

Briefly, prior art linear actuator disk drive 10 functions by radially moving read/write head 16 over disk surface 18 by means of a linearly moving access arm attached to a coil of wire with the entire assembly mounted on rails (not shown). The coil is surrounded by a rigidly mounted permanent magnet whereby passing current through the coil creates a force proportional to the current. This force causes the coil and access arm assembly to accelerate on its rails whereas reversing the current brings the assembly to a stop at the desired position over disk surface 18 as it rotates thereunder. Linear positioner 12 will cause read/write head to fly at a more linear height than in a rotary actuated disk drive since its skew angle with respect to the direction of rotation is constant but the linear positioner occupies more space, weighs more and requires more power than a rotary actuator disk drive.

Referring now to FIG. 2, a prior art rotary actuator disk drive 30 is illustrated. Prior art rotary actuator disk drive 30 comprises, in pertinent part, rotary positioner 32 for positioning read/write head 36 over the disk surface 38 of magnetic disk 34. Prior art rotary actuator disk drive 30 is housed within a head/disk assembly (HDA) 40 and, through the use of rotary positioner 32, read/write head 36 traverses disk surface 38 from inner diameter 42 to outer diameter 44 of magnetic disk 34 in an arc thereby changing its skew angle from the magnetic disk 34 OD to its ID.

Rotary positioner 32 operates on much the same electrical principal as with linear positioner 12 illustrated in FIG. 1. However, the resultant motion is a rotation of the axis arm to which read/write head 36 is secured, rather than an extension. Use of a rotary positioner 32 allows a disk drive designer to minimize the size and weight of the HDA 40. However, additional flying height difficulties are encountered as the read/write head 36 accelerates during seek operations and traverses disk surface 38 on an air bearing from inner diameter 42 to outer diameter 44 and back. As can be seen, not only will read/write head 36 (in conjunction with an air bearing slider as will be more fully described hereinafter) experience a lesser linear velocity of the disk surface 38 at inner diameter 42 than at outer diameter 44 as is the case with prior art linear actuator disk drive 10 of FIG. 1, the skew angle of read/write head 36 in combination with an air bearing slider changes from inner diameter 42 to outer diameter 44 as well.

With reference to FIG. 3, a portion of prior art rotary actuator 50 is shown. Prior art rotary actuator 50 includes access arm 56 to which is attached gimbal 60 for retaining slider 58. Slider 58 would also include a read/write head or other transducer not shown. Prior art rotary actuator 50, through the use of gimbal 60, allows slider 58 to pitch, roll and move vertically over a limited range, but not to yaw, that is change angle, with respect to the track or move forward, back or sideways. Slider 58 is shown with leading edge ramp 62 opposing the direction of rotation of magnetic disk 52 as slider 58 rides on an air bearing above disk surface 54 in order to pressurize air beneath air bearing surfaces of slider 58.

Pitch, roll and vertical motion give the slider 58 compliance with disk surface 54 and assist in maintaining a relatively constant flying height over minor surface irregularities. Yaw angle, fore-and-aft motion and sideways motion must be minimized inasmuch as they change the relationship between the head and the recorded track. Nevertheless, the difficulties in attempting to maintain a relatively uniform flying height of slider 58 over a wide range of skew angles, that is as the angle of slider 58 changes with respect to the direction of rotation of magnetic disk 52, has led to the design of transverse pressurization contour sliders for use in rotary actuated disk drives.

Referring now to FIGS. 4a and 4b, a prior art transverse pressurization contour (TPC) slider 70 is shown and, in conjunction with FIGS. 5a and 5b, is substantially as described in White, J. W., "The Transverse Pressure Contour Slider: Flying Characteristics and Comparisons with Taper-Flat and Cross-Cut Type Sliders", ASME Advances In Information Storage Systems, Vol. 3, 1991, pp. 1 et seq. and presented at the ASME/STLE Tribology Conference, St. Louis, Mo., Oct. 14–16, 1991. Reference should also be had to U.S. Pat. No. 4,673,996 issued Jun. 16, 1987 to White for "Magnetic Head Air Bearing Slider Assembly Utilizing Transverse Pressurization Contours" (describing total TPC to rail surface ratios of from 29% to 45%); U.S. Pat. No. 4,870,519 issued Sep. 26, 1989 to White for "Uniform Flying Height Slider Assembly with Improved Dynamic Air Bearing Characteristics" (describing the use of a single TPC surface per rail and a typical TPC to rail surface ratio of from 20% to 45% and claiming TPC to rail surface ratios of between 10% to 50%); and White, J. W., "A Uniform Flying Height Rotary Actuated Air Bearing Slider," IEEE Transactions on Magnetics, Vol. MAG-22, No. 5, September 1986, pp. 1028–1030 (describing total TPC to rail surface ratios of from 28% to 31%).

As shown in FIGS. 4a and 4b, prior art TPC slider 70 includes a body 72 extending from a leading end 74 to an oppositely disposed trailing end 76. Prior art TPC slider 70 incorporates an outer air bearing surface (ABS) 78 for disposition adjacent the disk outer diameter and an opposite inner air bearing surface 80 to be disposed toward the disk inner diameter. An ambient pressure slot 82 extends longitudinally from leading end 74 to trailing end 76 between outer rail 96 and inner rail 98 of prior art TPC slider 70. As shown, outer rail 96 and inner rail 98 include outer rail leading edge ramp 84 and inner rail leading edge ramp 86 respectively for disposition opposing the direction of rotation of the rotating magnetic storage media. Outer and inner leading edge ramps 84, 86 serve to assist in pressurizing the air bearing underneath the respective outer and inner rails 96, 98, of outer and inner air bearing surfaces 78, 80, respectively.

As described by White, prior art TPC slider 70 incorporates an outer diameter TPC surface 88 laterally disposed of outer air bearing surface 78. Additionally, a TPC surface 90 is medially disposed adjacent outer air bearing surface 78. In like manner, inner rail 98 incorporates, in addition to inner air bearing surface 80, TPC surface 92 and inner diameter TPC surface 94 medially and laterally disposed with respect thereto. As noted by White, the addition of the TPC surfaces 88, 90, 92 and 94 allows prior art TPC slider 70 to maintain a relatively constant flying height despite differing skew angles of the slider with respect to the direction of rotation of the rotating storage media, as is typically encountered in rotary actuated disk drives.

With respect to prior art TPC slider 70 as illustrated in FIGS. 4a and 4b, White suggests typical dimensions as follows: $L_x$=2.845 millimeters, $L_y$=2.235 millimeters, $a_i$=0.203 millimeters, $b_i$=0.330 millimeters, $c_i$=0.051 millimeters, $a_o$=0.216 millimeters, $b_o$=0.330 millimeters and $c_o$=0.051 millimeters. Thus, the TPC surfaces of each rail are seen to occupy from 43% to 45% (or less than 50%) of the total surface of outer and inner rails 96, 98. Other typical embodiments described in the article reflect total TPC surface areas of from 41% to 47% of the total rail surface area.

Referring again now to FIGS. 5a and 5b, prior art TPC slider 100 in accordance with White's teachings is shown, wherein, FIG. 5a represents prior art TPC slider 100 at a skew angle of −7° whereas the same prior art TPC slider 100 is shown in FIG. 5b at a positive skew angle of 13°. As shown, FIG. 5a would correspond to the position of prior art TPC slider 100 adjacent the inside data track whereas FIG. 5b shows the same device with respect to the disk outside data track. Prior art TPC slider 100 includes a body 102 extending generally from a leading end 104 to a trailing 106. Prior art TPC slider 100 includes outer ABS 108 and opposite inner ABS 110. Ambient pressure slot 112 extends from leading end 104 to trailing end 106 of body 102. Outer ABS 108 is formed on outer rail 114 while inner ABS 110 is likewise formed on inner rail 116. Outer diameter TPC surface 118 and TPC surface 120 are laterally and medially disposed about outer ABS 108 respectively. In like manner, TPC surface 122 and inner diameter TPC surface 124 are medially and laterally disposed about inner ABS 110. As previously described, outer rail 114 and inner rail 116 include respective outer and inner rail leading edge ramps 126, 128.

As again described by White, TPC surface 120 and inner diameter TPC surface 124 are wider than outer diameter TPC surface 118 and TPC surface 122 in order to provide additional lift to prior art TPC slider 100 at a negative skew angle adjacent the inner data tracks of a rotating storage medium. The additional lift provided by these surfaces is shown wherein the pressure numbers corresponding to lift are indicated as greater than 1.00 (or ambient pressure) while pressure numbers less than 1.00 indicate an attractive force on prior art TPC slider 100 towards the disk surface. When prior art TPC slider 100 is skewed to a positive angle adjacent the outer data tracks of a rotating storage medium the same surfaces provide a less than ambient pressure force on prior art TPC slider 100 in order to compensate for the fact that the linear velocity of the slider over the disk surface is greater at the disk outer diameter than at the disk inner diameter, and therefore, less lift is required of prior art TPC slider 100. Also as shown, outer diameter TPC surface 118 and TPC surface 122 provide pressurization contours which serve to provide lift, or greater than ambient pressure characteristics which vary according to the skew angle of the prior art TPC slider 100 as the same changes from the inner diameter to outer diameter of a rotating storage medium.

With reference to FIGS. 6a, 6b, and 7, an improved TPC slider 130 is shown. Improved TPC slider 130 includes a body portion 132, which may comprise a ceramic, presenting a rear end 134 as shown in FIG. 6a. Body 132 presents an upper surface 136 extending between inner edge 144 and outer edge 146.

On a surface opposite to upper surface 136 of improved TPC slider 130 an inner rail 138 (for disposition toward a rotating storage medium inner diameter) and opposite outer rail 140 (for disposition toward a rotating storage medium outer diameter) are formed. Inner rail 138 and outer rail 140 are separated by ambient pressure slot 142 as shown. An inner rail define notch 148 adjoins inner edge 144 of improved TPC slider 130 as well as an outer rail define notch 150 adjoining outer edge 146 thereof. Inner and outer rail define notches 148, 150 may be established by means of saw cuts into body 132. Similarly, rail define notches 152, 154 may also be formed through saw cuts to establish the medial dimensions of inner rail 138 and outer rail 140 as shown in addition to defining ambient pressure slot 142.

Inner rail 138 presents an inner ABS 156 whereas outer rail 140 presents a like outer ABS 158. Inner rail 138 further includes an ID lateral TPC surface 160 as well as an ID medial TPC surface 162. In like manner, outer rail 140 includes an OD medial TPC surface 164 as well as OD lateral TPC surface 166 as shown. A pressure relief slot surface 168 adjoins rail define notch 152 and rail define notch 154 within ambient pressure slot 142.

Improved TPC slider 130 as shown has been designed to fly, for example, at 4 micro inches with a 5 gram load on a 6,000 RPM, 5¼ inch disk with skew angles of plus/minus 12°. In this regard, the dimensions of improved TPC slider 130 as illustrated FIGS. 6a, 6b and 7 particularly may be:

$L_y$=1.600 mm; $RDC_i$=0.058 mm; $RDC_h$=0.395 mm; $RDC_w$=0.100 mm; $RDC_d$=0.030 mm; $ABS_h$=0.425 mm; $b_i$=0.197 mm; $b_o$=0.197 mm; $a_i$=0.216 mm; $c_i$=0.140 mm; $a_o$=0.254 mm; $c_o$=0.102 mm; $APS_h$=0.400 mm; w=0.178 mm; and $\Delta_h$=1.5 micrometers.

With reference explicitly to FIG. 7 in addition, improved TPC slider 130 is shown with body 132 extending between rear end 134 to leading end 174. Leading end 174 present inner and outer rail leading edge ramps 170, 172 as shown. In these views of improved TPC slider 130 dimensions $L_x$=2.04 mm; and $L_t$=0.196 mm.

Referring now to FIG. 8, an alternative embodiment of a TPC slider in accordance with the present invention is shown utilizing an etching process to define the rails thereof. TPC slider 180 includes a body 182 presenting an upper surface 186 extending between inner edge 194 and outer edge 196. In the view of FIG. 8, rear end 184 of TPC slider 180 is shown. On the surface of body 182 opposite to upper surface 186, an inner rail 188 and outer rail 190 have been formed for disposition toward a disk ID and disk OD respectively. Inner rail 188 and outer rail 190 are separated by a relatively deep ambient pressure slot 192 as shown. The dimensions of inner rail 188 are established by means of inner rail define notch 198 adjacent inner edge 194 and rail define notch 202 disposed medially of inner rail 188. In like manner, outer rail 190 is defined by means of outer rail define notch 200 adjacent outer edge 196 of body 182 as well as by rail define notch 204 medially disposed therefrom. TPC slider 180 may have inner and outer rail define notches 198, 200 and rail define notches 202, 204 formed by means of chemical etching, reactive ion etching or ion milling as opposed to the saw cuts of the embodiment of FIGS. 6a, 6b and 7. The relatively deep ambient pressure slot 192 may be formed by means of one or more saw cuts or an additional longer chemical etch, reactive ion etch or ion milling step.

Inner rail 188 presents inner ABS 206 for disposition towards a rotating storage medium. Inner ABS 206 has a laterally disposed ID lateral TPC surface 210 as well as a medially disposed ID medial TPC surface 212. Similarly, outer rail 190 includes an ID medial TPC surface 214 and OD lateral TPC surface 216. Pressure relief slot surface 218 interconnects rail define notches 202, 204 through shoulders 220, 222 respectively as shown.

With respect to the design of the TPC slider 180 intended to fly at 4 micro inches with a 5 gram load on a 6,000 RPM, 5¼ inch disk with skew angles of +/−12°, the following dimensions may pertain:

$L_y$=1.600 mm; $RDE_i$=0.058 mm; $RDE_h$=0.418 mm; $RDE_w$=0.039 mm; $ABS_h$=0.425 mm; $b_i$=0.197 mm; $b_o$=0.197 mm; $a_i$=0.216 mm; $c_i$=0.140 mm; $a_o$=0.254 mm; $c_o$=0.102 mm; $APS_h$=0.395 mm; and $APS_w$=0.300 mm.

Referring additionally now to FIG. 9, the benefits of the relatively deep ambient pressure slot 192 of TPC slider 180 illustrated in FIG. 8 are shown. Illustrated is the slider roll (in microradians) versus rail define (etch) depth plotted both with and without a central saw cut to establish a relatively deep ambient pressure slot 192 in TPC slider 180. Given a 1.237 inch radius and −11.792° skew, roll (in terms of microradians of from −15 to +15 and rail define etch depth [$ABS_h$-$RDE_h$] of from 0 to 20 micrometers) is illustrated with respect to a: no cut (indicated by black square boxes); b: a 200 micrometer wide cut (illustrated by white boxes); and a 300 micrometer wide cut (illustrated by black diamonds). As can be seen, at a rail define etch depth of 15 micrometers, acceptable roll characteristics are provided regardless of the existence of a central saw cut or its width. As tradeoffs are made with respect to the time (and concomitant expense) involved in etching to a depth of 15 micrometers as opposed to the relative speed of a more shallow rail define etch in conjunction with a central saw cut, it is observed that with no cut to define a relatively deep ambient pressure slot 192, rail define etch depths of somewhat less than 15 micrometers begin almost immediately to provide unacceptable roll to TPC slider 180. Similarly, with a 200 micrometer wide cut, while roll is acceptable with a rail define etch depth above 10 micrometers, it begins to become unacceptable below that point. Utilizing a 300 micrometer width cut to establish a relatively deep ambient pressure slot 192 provides a more uniform roll characteristic and, with a rail define etch depth of as little as 7 micrometers, provides acceptable roll stability. In the situation described, a cut of 300 micrometers in width is found to provide acceptable roll characteristics to TPC slider 180 while still allowing some margin of error in the establishment of a relatively deep ambient pressure slot 192 for the possible lateral mispositioning of the central saw cut in order to minimize the possibility of an inadvertent cut into either of the medial TPC surfaces 212, 214.

Referring now to FIGS. 10a–10e, a process in accordance with the present invention for manufacturing a TPC slider as disclosed is shown. In FIG. 10a, a wafer 230 is illustrated having a lapped surface 232 providing a first substantially planar surface of wafer 230. In FIG. 10b, photoresist 234 is patterned on lapped surface 232 of wafer 230 to pattern the air bearing surfaces of a TPC slider in accordance with the present invention. Through conventional photolithographic techniques, the photoresist is set and, as shown in FIG. 10c, the lapped surface 232 is etched away to establish etched surface 238 thereby establishing a second substantially planar surface on wafer 230. Photoresist 234 is also removed leaving the structure substantially as shown in FIG. 10c.

With reference now to FIG. 10d, the structure of FIG. 10c is further processed by means of a central saw cut 240 defining the medial dimensions of medial TPC surfaces 248, 250 which remain at the second substantially planar surface established by etched surface 238. Similarly, lateral saw cut 242 defines the dimensions of lateral TPC surface 246 while lateral saw cut 244 defines the lateral dimensions of lateral TPC surface 252. Central saw cut 240 also defines an ambient pressure slot between ABS surfaces 236. As shown in FIG. 10e, slider 260 in accordance with the present invention may then be separated from the remainder of wafer 230, which may comprise other additional sliders 260 in a row process, by parting slider 260 from the wafer 230 along parting lines 254 and 256.

As will be easily understood, the process described in FIGS. 10a–10e is applicable to the embodiment described in FIG. 8 in conjunction with an additional photolithographic and etching step to define the TPC slider rails and the formation of the ambient pressure slot may be either a single or multiple saw cuts as required. In like manner, the process shown in FIGS. 10a–10e may also be utilized in conjunction with multiple saw cuts to define the ambient pressure slot of the embodiment described in FIGS. 6a–6b and FIG. 7.

In conjunction with the above described process sequence illustrated in FIGS. 10a–10e, a leading edge ramp for pressurization of an air bearing between a rotating storage medium and the improved TPC slider 130 shown in FIGS. 6a–6b and 7 may be formed as further shown in FIGS. 11a–11c. With respect to the leading edge ramp and structure illustrated in FIGS. 11a, 11b and 11c, like structure to that previously described with respect to the embodiment of FIGS. 6a–6b and 7 is like numbered and foregoing description thereof shall suffice herefor.

Improved TPC slider 130 incorporates a leading edge ramp adjacent leading edge 174 for both rails thereof. As shown, inner rail 138 includes an inner rail leading edge ramp 170 which is formed by, for example, lapping of leading edge 174 subsequent to the formation of ID lateral TPC surface 160 and ID medial TPC surface 162 formed adjacent inner ABS 156. The resultant structure appears as shown. However, it has been determined that performing the lapping of the leading edge ramps (or taper) at this point, presents difficulty in alignment of the sliders for the taper process as the sliders must generally have been removed from their lapping tooling prior to performing the TPC defining steps described above. Therefore, following formation of the TPC surfaces, the slider must again be resecured to a lapping tool for formation of the leading edge ramps introducing another processing step and the possibility of misalignment of the sliders resulting in large and unacceptable variations in taper from one slider to the next in a processing row.

By formation of the leading edge ramps prior to the formation of the TPC surfaces, the foregoing problems can be avoided as illustrated in FIGS. 12a–12c. In the embodiment illustrated in FIGS. 12a, 12b and 12c, like structure to that described with respect to FIGS. 11a, 11b and 11c is like numbered with the addition of a prime ([1]) superscript and the foregoing description thereof shall again suffice herefor. By reversing the process steps of a) formation of the TPC surfaces and b) formation of the leading edge ramps, lapping of the row of sliders described with respect to FIG. 10a can be followed directly by lapping of the leading edge ramps (or taper) prior to formation of the TPC surfaces. As a consequence, the sliders need not be removed from the lapping tooling until all lapping operations are completed and alignment of a row of sliders is maintained throughout this operation, obviating additional tooling mounting and removal processes. This new process results in a slider having the structure shown in FIGS. 12a–12c wherein the TPC surfaces extend onto the leading edge ramp itself. Other than the benefits of producing more uniform leading edge ramps across a row of sliders which have undergone a lapping process to form the same, modelling has shown that under particular conditions, sliders having leading edge ramps as shown in FIGS. 12a–12c may fly with a slightly elevated pitch thereby leading to potential benefits in head/disk reliability.

While the formation of leading edge ramps in accordance with an improved processing sequence has been described with respect to improved TPC slider 130 as illustrated in FIGS. 6a–6b and 7, the same benefits can be observed with respect to TPC slider 180 illustrated in FIG. 8.

What has been provided, therefore, is a TPC slider and method in which the TPC surfaces occupy more than 50% of each rail and/or in which the width of each TPC surface may be defined by another relatively shallow step. The depth of the secondary "rail define" steps may not generally be deep enough to relieve the pressure to ambient in the ambient pressure slot, especially at high skew angles. The effect on flying height is, therefore, minimized by the addition of a deep ambient pressure slot between the rails. Also provided is a means for addressing relatively large manufacturing tolerances in the production of TPC sliders which has not been disclosed in prior art techniques. That is, when one attempts to define the rail widths with conventional sawing techniques, lateral mispositioning can cause a wide variation in the effective angle of each TPC slider. As sliders are designed to fly closer to a rotating storage media surface, the main air bearing surface portion of the rails gets narrower and the effect of a mispositioned cut on the effective TPC angle becomes greatly magnified, especially if TPC widths are scaled down the same as other slider dimensions.

Prior art techniques as described, suggest total TPC surface widths occupying from 25% to 50% of the rail surface. In the TPC slider and method of the present invention, TPC surface widths are not scaled down as much resulting in TPC surfaces that occupy more than 50% of the rail surface. The extra width of each TPC surface helps minimize sensitivity to mispositioned rail define cuts.

Further, while photolithographic techniques along with ion milling, chemical etching or reactive ion etching offer more precision than saw cutting they are nonetheless very time consuming with the time required to effectuate the etch or milling operation being proportional to desired depth. The extra time and photoresist thicknesses required for such etching or milling steps limit the desirability of such methods for this increased depth, as previously shown to be about 15 micrometers. When using an etch to define shallow rail define shoulders, the effect can be minimized by using them in conjunction with a relatively deep (that is greater than 15 micrometers), saw cut through the central portion of the slider. Lateral mispositioning of the saw cut is then of little consequence provided it does not totally wipe out the shallow rail defined shoulders. Further, as shown in FIGS. 10a–10e, the ambient pressure slot, as well as the air bearing surface and TPC surface dimensions, can be set through means of as little as three saw cuts. Utilizing TPC surfaces occupying greater than 50% of the rail width allows for sufficient manufacturing tolerances in order to use such relatively rapid and reproducible saw techniques.

While there have been described above the principles of the invention in conjunction with specific apparatus, it is to be clearly understood that the foregoing description is made only by way of example and not as a limitation to the scope of the invention.

What is claimed is:

1. A slider for maintaining a computer storage device transducer at a generally uniform flying height above a rotating storage medium as said slider is positioned with respect thereto, said slider including a generally elongate body portion having at least one major surface presenting at least two longitudinally positioned, generally parallel and spaced apart rails for extension towards said rotating storage media, wherein the improvement comprises:

an air bearing surface formed on a distal surface portion of said rails, said air bearing surface occupying less than 50% of said distal surface portion of said rails; and at least one transverse pressurization contour adjoining said air bearing surface at said distal surface portion of said rails.

2. The slider of claim 1 wherein said rails further comprise a leading edge ramp at one end thereof for positioning in opposition towards a direction of rotation of said storage media.

3. The slider of claim 1 wherein said slider further comprises an ambient pressure slot between said rails.

4. A slider for controlling the flying height of a computer storage device transducer above a rotating storage medium, comprising:

an elongated body having a medium facing major surface;

a leading edge on the major surface;

a trailing edge on the major surface;

first and second generally parallel and spaced apart rails disposed on the major surface and extending substantially between the leading edge and the trailing edge;

a first medium facing air bearing surface on the first rail;

a second medium facing air bearing surface on the second rail;

a first medium facing transverse pressurization contour surface and a second medium facing transverse pressurization contour surface longitudinally disposed on the first rail;

a third medium facing transverse pressurization contour surface and a fourth medium facing transverse pressurization contour surface longitudinally disposed on the second rail;

the first transverse pressurization contour surface being located laterally of the first air bearing surface;

the second transverse pressurization contour surface being located medially of the first air bearing surface;

the third transverse pressurization contour surface being located medially of the second air bearing surface;

the fourth transverse pressurization contour surface being located laterally of the second air bearing surface;

the first and second transverse pressurization contour surfaces occupying more than 50% of the first medium facing rail surface of the first rail; and the third and fourth transverse-pressurization contour surfaces occupying more than 50% of the second medium facing rail surface of the second rail.

\* \* \* \* \*

UNITED STATES PATENT AND TRADEMARK OFFICE
CERTIFICATE OF CORRECTION

PATENT NO. : 6,181,518 B1
DATED : January 30, 2001
INVENTOR(S) : Harris et al.

It is certified that error appears in the above-identified patent and that said Letters Patent is hereby corrected as shown below:

<u>Column 14,</u>
After line 6, add claims 5 and 6:

5. The slider of claim 4 wherein the first and second rails each include a leading edge ramp adjoining the leading edge of the elongated body.

6. The slider of claim 4 including an ambient pressure slot disposed on the major surface between the first and second rails.

Signed and Sealed this

Twenty-sixth Day of November, 2002

*Attest:*

*Attesting Officer*

JAMES E. ROGAN
*Director of the United States Patent and Trademark Office*